(12) United States Patent
Zolotuhin

(10) Patent No.: US 10,583,902 B2
(45) Date of Patent: Mar. 10, 2020

(54) PONTOON BOAT WITH ELEVATED FRONT WAVE GUARD

(71) Applicant: Mihail Zolotuhin, Sandy, UT (US)

(72) Inventor: Mihail Zolotuhin, Sandy, UT (US)

( * ) Notice: Subject to any disclaimer, the term of this patent is extended or adjusted under 35 U.S.C. 154(b) by 0 days.

(21) Appl. No.: 15/938,546

(22) Filed: Mar. 28, 2018

(65) Prior Publication Data

US 2018/0312230 A1 Nov. 1, 2018

Related U.S. Application Data

(63) Continuation-in-part of application No. 29/609,369, filed on Jun. 29, 2017, and a continuation-in-part of application No. 29/601,860, filed on Apr. 26, 2017.

(51) Int. Cl.

| | | |
|---|---|---|
| *B63B 17/00* | (2006.01) |
| *B63B 59/02* | (2006.01) |
| *B63B 1/12* | (2006.01) |
| *B63B 1/40* | (2006.01) |
| *B63B 43/04* | (2006.01) |
| *B63B 1/00* | (2006.01) |

(52) U.S. Cl.
CPC .............. *B63B 59/02* (2013.01); *B63B 1/125* (2013.01); *B63B 1/40* (2013.01); *B63B 43/04* (2013.01); *B63B 2001/005* (2013.01); *B63B 2017/009* (2013.01); *Y02T 70/125* (2013.01)

(58) Field of Classification Search
CPC ........ B63B 2001/005; B63B 2017/009; B63B 35/34; B63B 35/36; B63B 35/38; B63N 2017/045
See application file for complete search history.

(56) References Cited

U.S. PATENT DOCUMENTS

| | | | |
|---|---|---|---|
| 4,562,786 A | 1/1986 | Pruonto | |
| D298,310 S | 11/1988 | Robbins | |
| 5,105,755 A | 4/1992 | Davidson | |
| D341,811 S | 11/1993 | Pepper | |
| D369,337 S | 4/1996 | Stevens | |
| 5,540,169 A | 7/1996 | Davis | |
| 5,706,752 A | 1/1998 | Menne | |
| 5,746,146 A * | 5/1998 | Bixel, Jr. .................. | B63B 1/20 |
| | | | 114/67 A |

(Continued)

FOREIGN PATENT DOCUMENTS

| | | |
|---|---|---|
| CA | 2414545 A1 | 7/2004 |
| DE | 3924362 A1 | 1/1991 |

(Continued)

*Primary Examiner* — Andrew Polay
(74) *Attorney, Agent, or Firm* — Pate Peterson PLLC; Brett Peterson

(57) ABSTRACT

A pontoon boat includes first and second pontoons on the port and starboard sides of the boat and a main deck attached to the top of the pontoons. A front wave deflector extends forwards and upwards from the front of the main deck at an angle. The front wave deflector is held above the water and does not contact the water while the pontoon boat is floating in or moving through calm water. The front wave deflector contacts the tops of waves when the pontoon boat is navigating rough water and pushes the water beneath the pontoon boat deck. This allows the pontoon boat to navigate rough water without loss of momentum and without excessive up and down pitching.

20 Claims, 17 Drawing Sheets

(56) References Cited

U.S. PATENT DOCUMENTS

| | | |
|---|---|---|
| 6,209,477 B1 | 4/2001 | Biedenweg |
| D516,495 S | 3/2006 | Menne |
| 7,028,632 B2 | 4/2006 | Blank |
| 7,107,926 B2 | 9/2006 | Fishburn |
| 7,484,472 B1 | 2/2009 | Highfield |
| D641,747 S | 7/2011 | Gisborne |
| 8,056,496 B1 | 11/2011 | Bussa |
| 8,770,136 B2 | 7/2014 | Larson |
| 9,302,740 B2 | 4/2016 | O'Neal |
| 9,475,548 B1 | 10/2016 | Slocum |
| D773,373 S | 12/2016 | Mayes |
| D780,087 S | 2/2017 | Deurr |
| 9,586,655 B1 | 3/2017 | Butler |
| 9,611,008 B1 | 4/2017 | O'Neal |
| 9,783,267 B1 | 10/2017 | Alexander |
| 9,914,507 B2 | 3/2018 | Falahee |
| 10,017,235 B2 | 7/2018 | Pappas |
| 10,308,320 B1 | 6/2019 | O'Neal |
| 2007/0022938 A1 | 2/2007 | Fishburn |
| 2007/0221114 A1 | 9/2007 | Schaaf |
| 2007/0295255 A1 | 12/2007 | Stryjewski |
| 2007/0295264 A1 | 12/2007 | Fishburn |
| 2010/0229775 A1 | 9/2010 | Cochran |
| 2013/0025519 A1 | 1/2013 | Cooney |
| 2013/0025527 A1 | 1/2013 | Cooney |
| 2017/0029069 A1 | 2/2017 | Deurr |

FOREIGN PATENT DOCUMENTS

| | | |
|---|---|---|
| FR | 2261923 A1 | 9/1975 |
| JP | 2003327193 A | 11/2003 |
| JP | 2010064724 A | 3/2010 |
| JP | 2011152891 A | 8/2011 |
| JP | 2012162116 A | 8/2012 |
| WO | WO 2016/193169 A1 | 12/2016 |

* cited by examiner

PONTOON BOAT WITH ELEVATED FRONT WAVE GUARD

PRIORITY

The present application is a continuation-in-part of U.S. Design Application Ser. No. 29/601,860, filed Apr. 26, 2017, which is herein incorporated by reference in its entirety, and is a continuation-in-part of U.S. Design Application Ser. No. 29/609,369, filed Jun. 29, 2017, which is herein incorporated by reference in its entirety.

THE FIELD OF THE INVENTION

The present invention relates to pontoon boats. In particular, examples of the present invention relates to a front wave deflector which is located above the pontoons at the front of the boat. The front wave deflector may be combined with an elevated from deck portion which is positioned one to two feet above the pontoon boat deck.

BACKGROUND

Pontoon boats are commonly used pleasure-craft on smaller lakes. Pontoon boats include two or three sealed pontoon tubes with a flat deck that is attached to the top of the pontoon tubes. Pontoon boats are desirable for several reasons. The sealed pontoon tubes provide flotation for the boat and the boat is extremely resistant to sinking. The design of pontoon boats provides a large flat deck for use by the boat occupants. The large deck lends itself well to fishing, parties, etc. as it provides a large flat space where people can stand and walk around.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
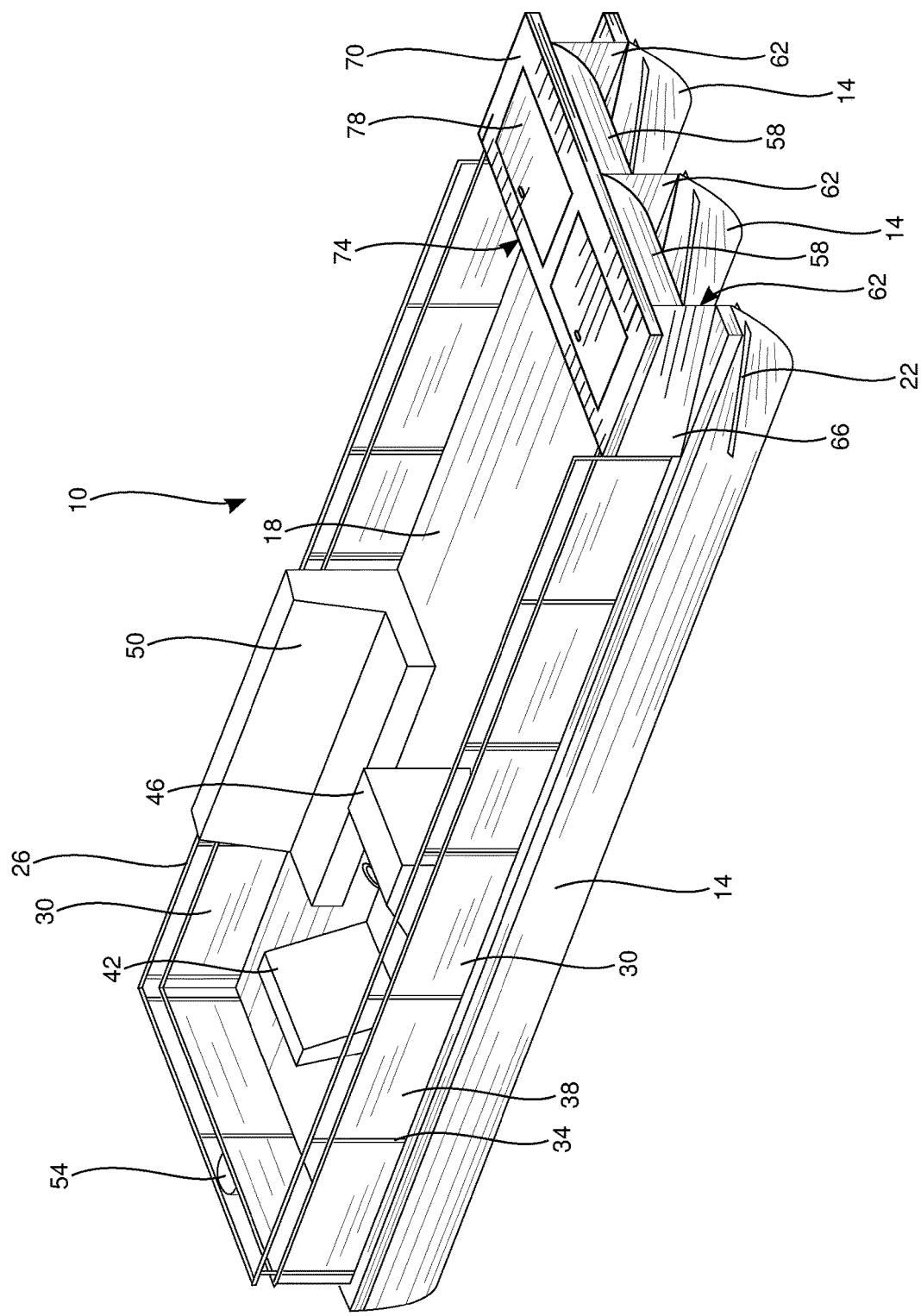
FIG. 1 shows a top perspective view of a pontoon boat.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

The disclosure particularly describes a pontoon boat with a modified front deck and wave deflector. Particularly, the present disclosure describes a modified pontoon boat which is able to traverse rough waters quickly and safely. Applicant has discovered that conventional pontoon boats are unsuitable for navigation of rough waters. Wind and storms on even smaller inland lakes result in waves over a foot high. Applicant has discovered that, in rough waters, conventional pontoon boats will rise and change their longitudinal pitch significantly rather than staying flat in the water. Attempting to pilot the pontoon boat over even small waves results in water from the waves coming over the front of the pontoon boat deck and crashing down on the front of the pontoon boat deck. The weight and momentum of the water on the front of the pontoon boat deck pushes the bow of the pontoon boat down and makes it easier for additional water to pass over the pontoon boat deck. The downward pitching of the pontoon boat when waves come over the front deck frequently lifts the rear of the pontoon boat and lifts the pontoon boat motor out of the water. This unloads the motor and propeller and causes the motor to over-rev. This over-revving may cause damage to the boat motor. Additionally, the pontoon boat loses much of its forward speed when the front of the pontoon boat is pushed down into the water. This creates a lurching motion which is unsafe and uncomfortable for passengers. Instead of riding over the waves, a pontoon boat will frequently respond in the above manner with the wave coming over the pontoon boat deck and pushing the bow of the pontoon boat downwardly into the water.

While the pontoon boat is unlikely to sink due to its sealed pontoons, the pitching motion of the boat and the lifting of the boat motor and propeller out of the water makes it difficult to pilot a pontoon boat in rough seas at any reasonable speed. The pontoon boat is forced to travel very slowly in the rough water or to simply wait stranded in the rough water. Applicant has discovered that pontoon boats are thus frequently trapped in rough waters and are unable to make headway towards shore. Being trapped in the rough waters is very disconcerting to the passengers of the pontoon boat. Moreover, the up and down pitching of the pontoon boat makes it dangerous for passengers and makes it much easier for passengers or items on the boat deck to fall off of the pontoon boat. Applicant has thus discovered that while pontoon boats are well suited for marine recreation, they are very ill suited for navigating rough waters. Persons on a pontoon boat which is caught in an unexpected storm are thus placed in a dangerous situation which is difficult to get out of.

Figure 2:
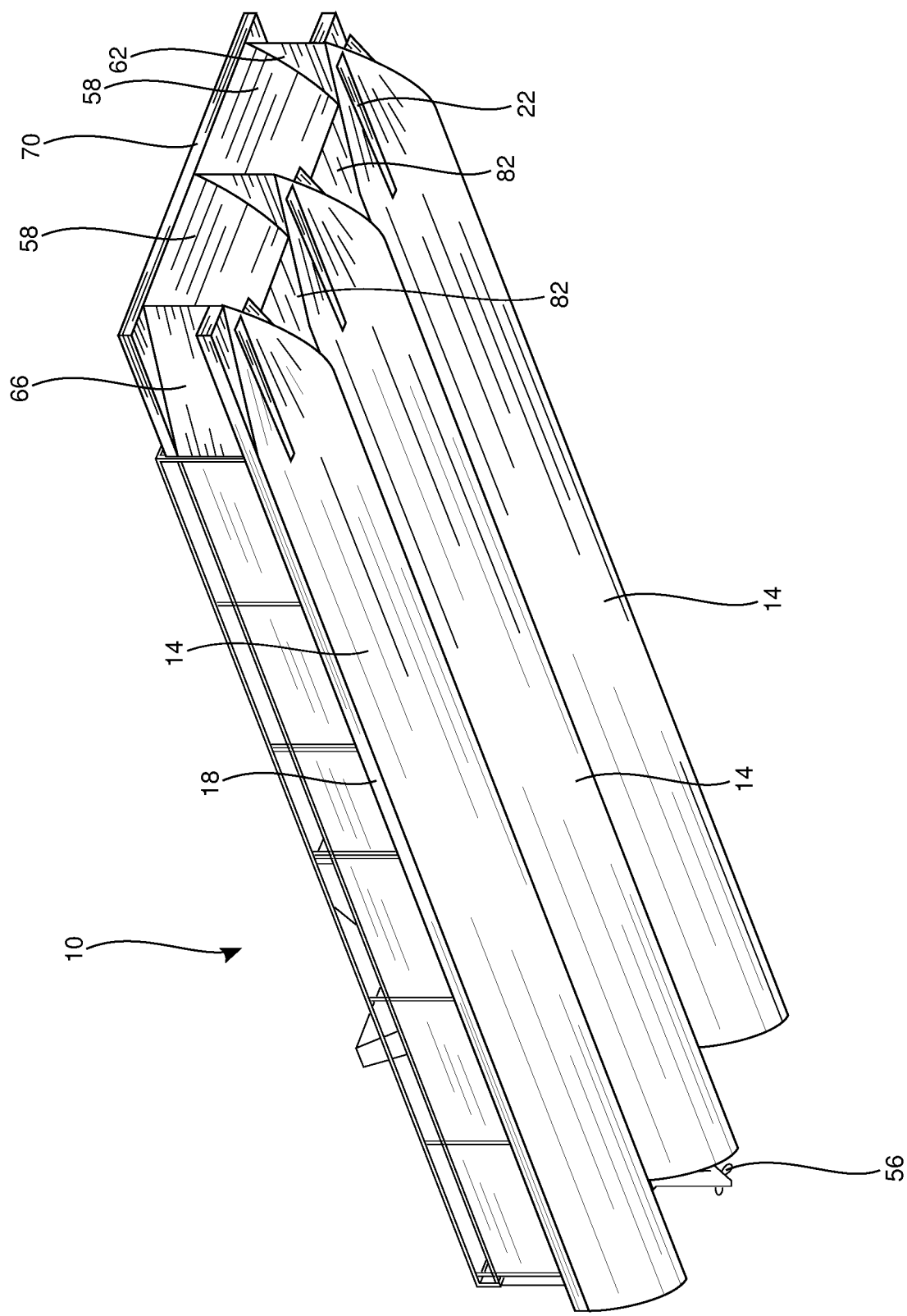
FIG. 2 shows a bottom perspective view of the pontoon boat.

Turning now to FIGS. 1 and 2, perspective views of a pontoon boat 10 according to the present invention are shown. FIG. 1 shows an upper perspective view of the pontoon boat 10. FIG. 2 shows a lower perspective view of the pontoon boat 10. The pontoon boat 10 includes multiple pontoons 14 which are attached to the bottom side of a flat main deck 18. The pontoon boat 10 typically includes two or three pontoons 14. The pontoon boat 10 is shown with three pontoons 14. A pontoon boat 10 with only two pontoons 14 would omit the center pontoon 14 and keep the port and starboard pontoons 14. The pontoons 14 are placed parallel to each other along the width of the pontoon boat 10. The rear end of each pontoon 14 is located adjacent the rear edge of the boat deck 18 and the front end of each pontoon 14 is located near the front of the boat 10.

Each pontoon 14 is an elongate sealed tube which extends approximately the length of the pontoon boat 10. Each pontoon 14 is sealed and creates a chambered hollow interior which provides buoyancy to the pontoon boat. The pontoons 14 are typically made from aluminum sheet which is formed into the desired shape and welded together. The pontoons 14 include exterior sidewall panels, a rear cap, a front bow section, and interior partitions which are all welded together to create the pontoon 14. The pontoons 14 are very resistant to puncture because of their metal construction. It is difficult to sink a pontoon boat 10 due to the durable sealed pontoons 14.

Each pontoon 14 is approximately 20 feet long and may be between approximate 15 feet long and 30 feet long or longer depending on the overall length of the pontoon boat 10. Consumer oriented pontoon boats are commonly between about 15 and about 30 feet long and between about 7 and about 10 feet wide. Pontoon tubes 14 are between approximately 24 inches and 36 inches in width and height depending on the size and characteristics of the pontoon boat 10. The pontoons 14 extend along all of or substantially all of the length of the pontoon boat 10. Each pontoon 14 may have a round or "V" shaped cross section. As shown, the example pontoons 14 have "V" shaped cross sections and have convex rounded sidewalls. The front bow section of each pontoon 14 has sides which are drawn together to a central keel and is "V" shaped when viewed horizontally to allow the pontoon to move through the water more easily. Splash guards 22 may be placed longitudinally along the front bow section of the pontoon tubes 14. As the pontoon 14 travels through water, water is often splashed up at the front of the pontoon tubes 14. The splash guards 22 deflect this splashed water horizontally and prevent much of the water from splashing above the deck 18 in normal operation of the pontoon boat 10.

A pontoon boat 10 typically has a deck framework (not shown) which is attached to the pontoons 14 and which supports the deck structure and provides an overall frame structure to the pontoon boat 10. The deck framework typically includes lateral beams which extend laterally across the tops of the pontoons 14 and connect the pontoons 14 together. The upper surface of the deck 18 is supported by the deck framework. A railing 26 is typically attached to the deck 18 and extends around the perimeter of the deck 18 to provide safety to the boat passengers. The railing 26 usually includes one or two hinged gates 30 to allow access to the boat deck 18. The railing 26 is typically formed with horizontal and vertical aluminum tubes 34 which are attached together and with metal or plastic panels 38 which are attached between the aluminum tubes 34. The main deck 18 is flat (planar) and covers at least a majority of the pontoons; covering between about 70 and about 100 percent of the pontoons 14, and more particularly between about 75 and about 90 percent of the pontoons 14. As shown in the figures, the main deck 18 covers approximately 80 percent of the pontoons 14. The main deck 18 covers the entire width of the pontoons and approximately 80 percent of the length of the pontoons. A main deck 18 which covers the entirety of the width of the pontoons 14 and a majority of the length of the pontoons 14 is typical of the pontoon boat 10.

The pontoon boat 10 includes a seat 42 for the captain and a helm 46 which typically includes a steering wheel and motor/boat controls. The seat 42 and helm 46 are attached to the deck 18. Depending on the desired configuration, the pontoon boat 10 often includes additional seats or couches 50 which are attached to desired locations on the deck 18. A significant advantage of pontoon boats 10 over conventional boats is that the pontoon boat has a large flat deck which covers substantially all of the pontoon boat 10. This deck 18 provides a large area for recreational purposes and provides flexibility in configuring a pontoon boat 10 for a desired use. If desired, a large number of couches or seats 50 may be installed around the pontoon boat deck 18. Alternatively, a pontoon boat 10 may include a large open area on the deck 18 to allow fisherman to fish from the pontoon boat deck 18. A canopy or sun shade can easily be mounted to the pontoon boat 10 if desired. The pontoon boat 10 includes one or more motors 54 with a propeller 56 attached to the back of the pontoon boat 10.

As mentioned, a significant disadvantage of conventional pontoon boats is their relative inability to navigate rough water. Accordingly, the pontoon boat 10 includes a front wave deflector 58 which extends laterally across the front of the pontoon boat 10. The front wave deflector 58 is attached to the pontoon boat 10 above the pontoon tubes 14 and extends upwardly and forwardly from its attachment point.

The front wave deflector 58 extends laterally between the port and starboard pontoons and may be approximately as wide as the deck 18. Alternatively, the front wave deflector 58 may have a width which is approximately equal to the centerline distance between the left and right (outer) pontoons 14 as is shown.

The front wave deflector 58 is attached to the front of the deck 18 so that there is no space between the front wave deflector 58 and the deck 18. Accordingly, the front wave deflector 58 extends upwardly and forwardly from the front of the deck 18. In the example pontoon boat 10, the front wave deflector 58 is between approximately 1 foot and approximately 2 feet high and is between approximately 6 feet and approximately 8 feet wide. The front wave deflector 58 has a vertical height which is greater than or equal to one third of the height of the pontoons 14. More preferably, the front wave deflector 58 has a vertical height which is between about two thirds of the height of the pontoons 14 and about the height of the pontoons 14. That is to say that the front wave deflector may extend above the main deck 18 to this vertical height. Support braces 62 are attached to the front wave deflector 58 and support the front wave deflector 58. The support braces 62 are also attached to the pontoons 14 and may also be attached to the front of the deck 18. The support braces 62 keep the front wave deflector 58 from bending under use. The support braces 62 keep the front wave deflector 58 from bending upwardly or downwardly as well as from collapsing inwardly and losing its shape. The example pontoon boat 10 includes 3 support braces 62 which are each attached to the top of a pontoon 14 and to the bottom of the wave deflector 58.

If the front wave deflector 58 is narrower than the deck 18, angled sidewalls 66 may be positioned at the sides of the front wave deflector 58. The front of the angled sidewalls 66 are attached to a support brace 62 and the rear of the angled sidewalls angles outwardly to the width of the deck 18. The angled sidewalls 66 move water which is above the deck 18 sideways to keep the water off of the deck 18.

If desired, an elevated fore deck 70 may be attached to the top of the front wave deflector 58. The elevated fore deck 70 is thus located above the main deck 18 of the pontoon boat 10 which is located at the bottom of the front wave deflector 58. If desired, a vertical dividing wall 74 may be attached at the back of the front wave deflector 58 so that it extends upwardly from the main deck 18. The vertical dividing wall may attach to the bottom of an elevated fore deck 70. Such a structure forms a hold or storage area between the vertical dividing wall 74, the front wave deflector 58, and the elevated fore deck 70. One or more access doors or hatches 78 may be installed in the vertical dividing wall 74 or in the elevated fore deck 70. The access hatch 78 allows a person to store items such as a cooler or cargo in the hold area formed behind the front wave deflector 58. An access hatch 78 formed in the elevated fore deck 70 allows the front hold area to be used as a fish hold while fishing. The elevated fore deck 70 may be used as a fishing platform.

The front wave deflector 58 may be formed with a primary panel 58 in combination with a secondary deflector panel 82. The front wave deflector 58 extends backwardly to the main deck 18 and connects to the main deck 18 so that water cannot enter onto the top of the main deck from between the main deck 18 and the front wave deflector 58. Deflector panel 82 is visible in the bottom perspective view shown in FIG. 2. FIG. 2 also better illustrates how the front wave deflector 58 has a rear edge which is located at or near the plane of the deck 18 (i.e. level with the deck 18). The front wave deflector 58 extends forwards to the bow of the pontoon boat 10 and simultaneously extends upwardly away from the plane of the deck 18 so that the front wave deflector 58 angles upwardly away from the plane of the deck 18. The front wave deflector 58 may be disposed at an angle which is between approximately 20 degrees and approximately 60 degrees from horizontal, and is more commonly disposed at an angle which is between approximately 30 degrees and approximately 45 degrees from horizontal.

Figure 3:
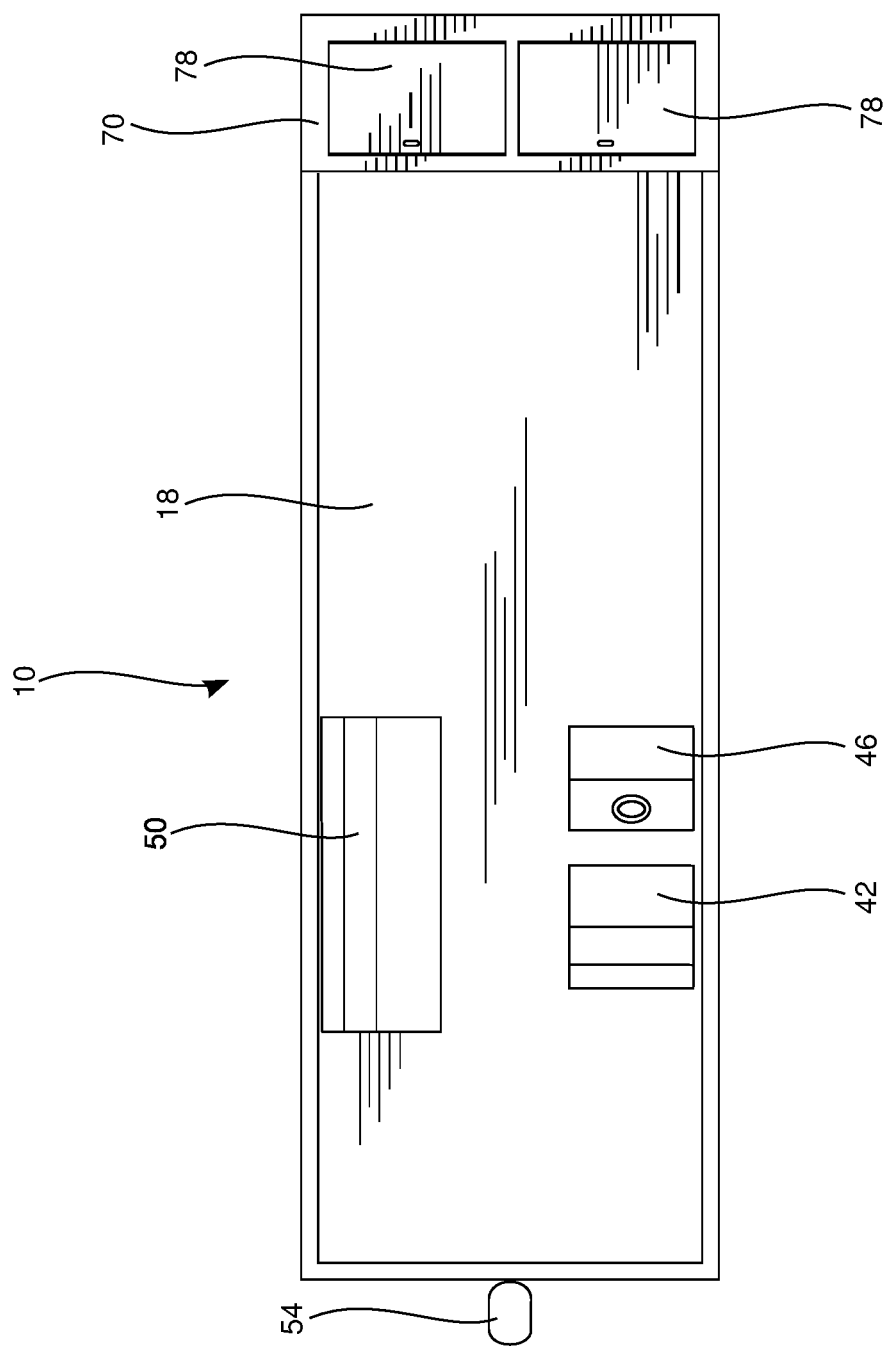
FIG. 3 shows a top view of the pontoon boat.

FIG. 3 shows a top view of the pontoon boat 10. The relative lengths of the main deck 18 and the elevated fore deck 70 can be seen. The elevated fore deck 70 is approximately 15 percent of the length of pontoon boat 10 and may often be between approximately 10 percent and approximately 20 percent of the length of the pontoon boat 10. For many pontoon boats 10, the elevated front deck 70 is approximately 3 feet long and may be between approximately 2 feet and approximately 4 feet long (front to back), and is approximately as wide as the pontoon boat 10.

Figure 4:
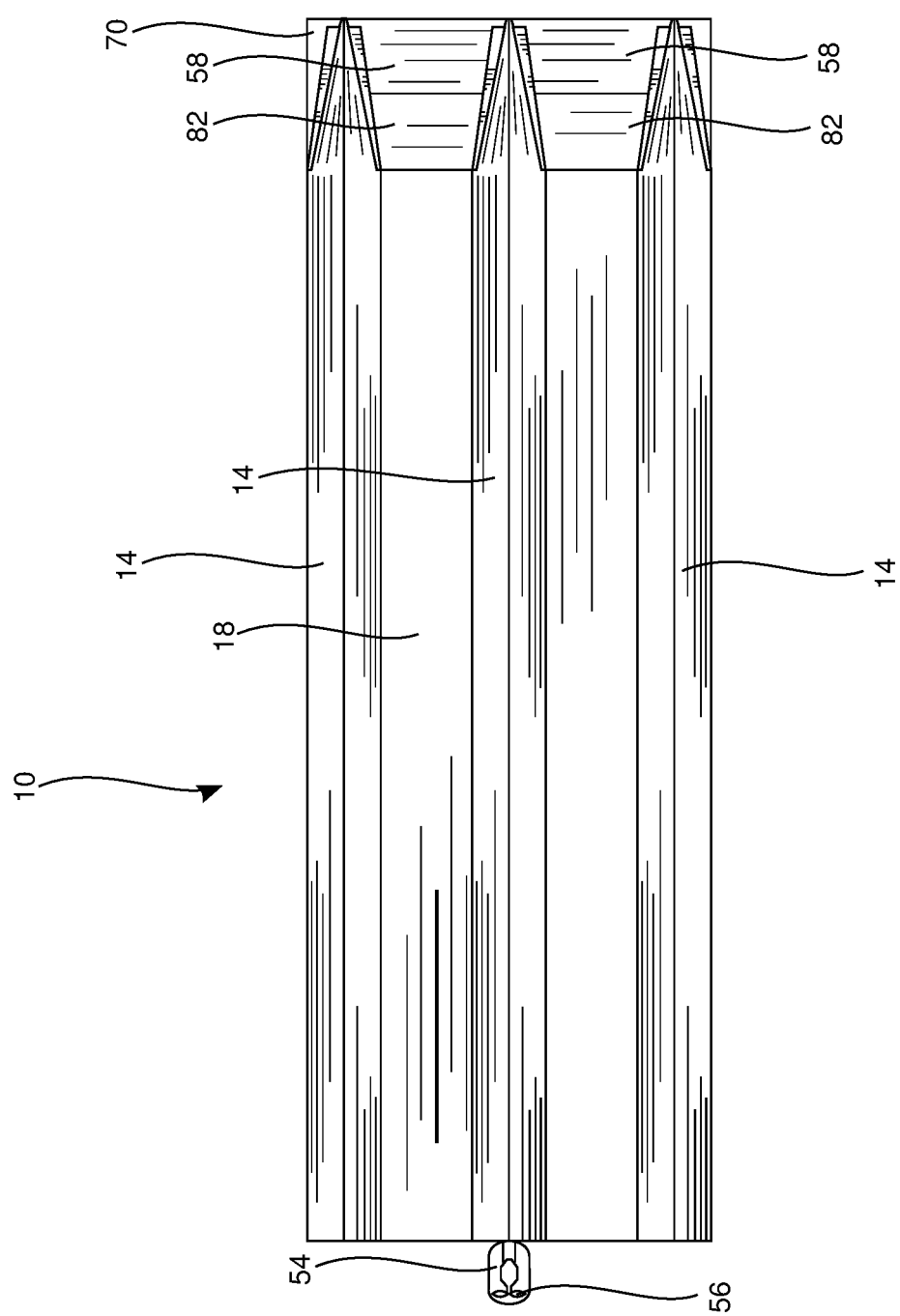
FIG. 4 shows a bottom view of the pontoon boat.

FIG. 4 shows a bottom view of the pontoon boat 10. It can be seen how the main deck 18 terminates in front before reaching the front of the pontoon tubes 14. The front wave deflector 58 begins forwards of the front of the main deck 18 and extend forwards and upwards from this starting location.

Figure 5:
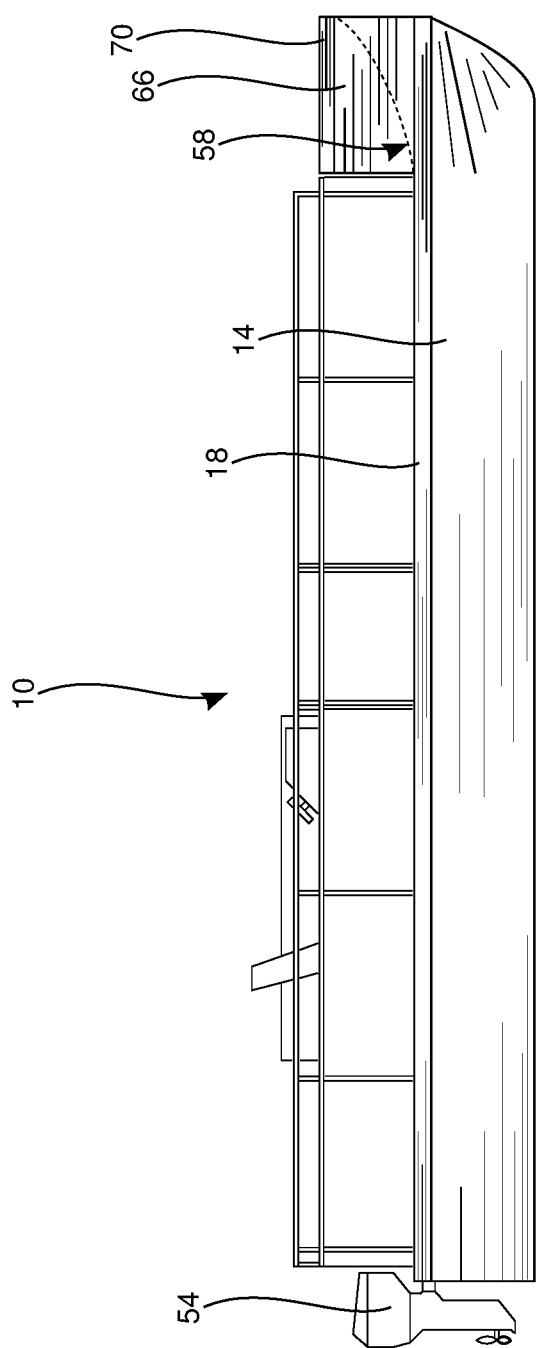
FIG. 5 shows a side view of the pontoon boat.

FIG. 5 shows a side view of the pontoon boat 10. FIG. 5 illustrates how the front wave deflector 58 (shown in dashed lines) is positioned vertically above the main deck 18. The front wave deflector 58 has a lower rear edge which is positioned adjacent the bottom surface of the main deck 18 and a front upper edge which is positioned between approximately 12 and approximately 24 inches above the main deck 18.

Figure 6:
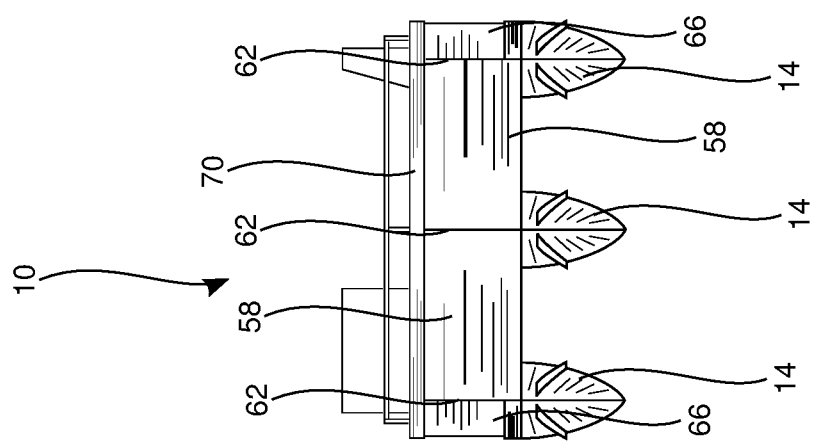
FIG. 6 shows a front view of the pontoon boat.
Figure 7:
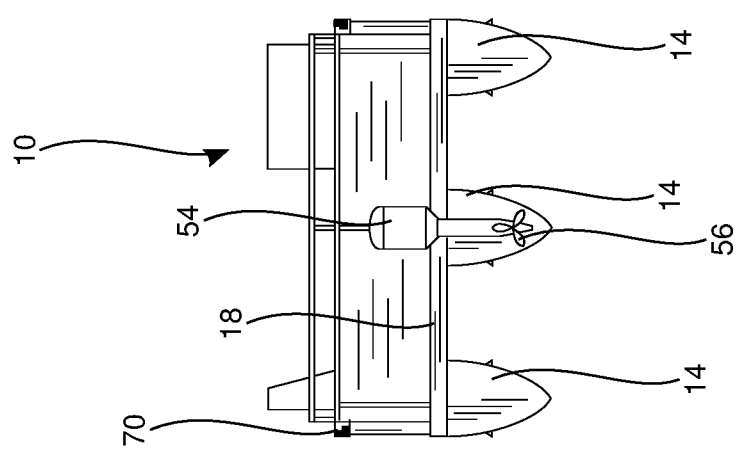
FIG. 7 shows a back view of the pontoon boat.

FIG. 6 shows a front view of the pontoon boat 10 and provides additional visual reference to the vertical positioning of the front wave deflector relative to the main deck. FIG. 6 illustrates how the front wave deflector 58 has a width which is typically between the width between centers of the outer pontoon tubes 14 and the width of the main deck 18. A majority of the benefit of the front wave deflector 58 is achieved when the wave deflector 58 is approximately as wide as the distance between the centers of the outer pontoon tubes. A front wave deflector 58 which is narrower than the width between the outer pontoon tubes typically provides less benefit than a wider front wave deflector 58. A front wave deflector 58 which is approximately as wide as the main deck 18 provides a small improvement over a front wave deflector 58 which is approximately as wide as the distance between outer pontoon centers. FIG. 7 shows a rear view of the pontoon boat 10.

Figure 8A:
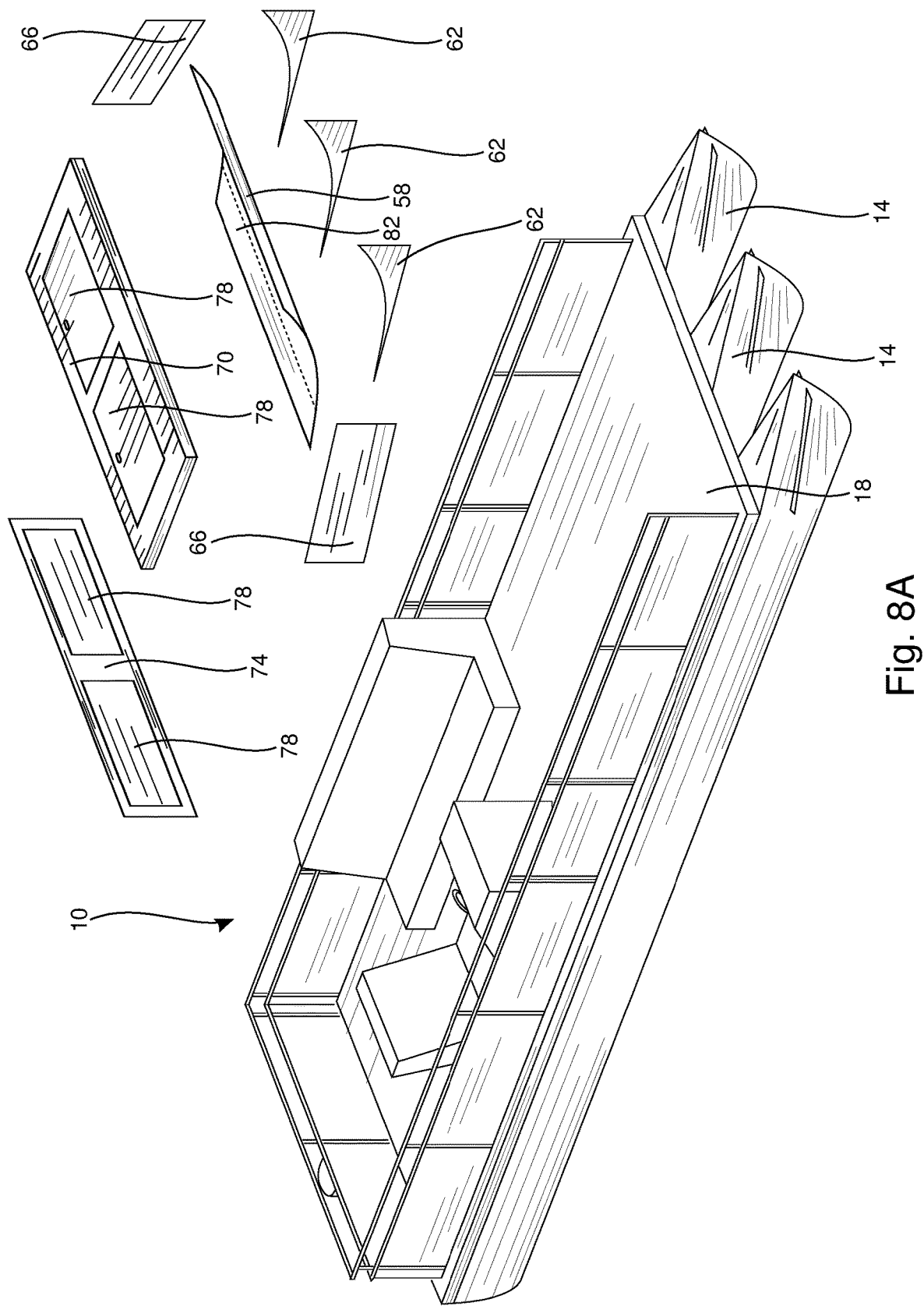
FIG. 8A shows an exploded view of the front of the pontoon boat.

FIG. 8A shows an exploded view of the front wave deflector 58 and associated components. As shown, the front of the main deck 18 is positioned aft of the front of the pontoon tubes 14. The fronts of the pontoon tubes 14 extend forwards beyond the front of the main deck 18. It can be seen that, as used, the deflector panel 82 continues the shape of the front wave deflector 58 and thus serves as a part of the front wave deflector 58, allowing the front wave deflector 58 to be more easily fabricated. In this manner, the front wave deflector 58 may be formed from one or more pieces of material to provide the resulting shape and functionality. The front wave deflector 58 (and the associated deflector panel 82 if used) are attached to the front of the main deck and extend forwards and upwards therefrom.

The support braces 62 are attached to the tops of the pontoons 14 and support the front wave deflector 58 both horizontally and vertically and also help to preserve the shape of the front wave deflector 58. In addition to or instead of support braces 62, internal support braces 62A may be placed above the front wave deflector 58 and attached to the front wave deflector 58, elevated fore deck 70, and vertical dividing wall 74. The left and right support braces 62 may be formed as a rectangular shape (shown) and the front wave deflector 58 may be attached to the face of the support brace so that the ends of the front wave deflector 58 are closed by the end support braces 62.

The vertical dividing wall 47, support braces 62, front wave deflector 58, and elevated fore deck 70 may thus form an enclosed area which provides a storage space or fishing hold. One or more hatches 78 may be formed in the vertical dividing wall 74 or in the elevated fore deck 70 as desired. The above structures may be formed from aluminum and each of these structures may be welded together as well as welded to the pontoon tubes 14 and main deck 18.

Where the front wave deflector 58 is narrower than the main deck 18 (e.g. approximately as wide as the distance between the centers of the side pontoons 14), the outwardly sloping sidewalls 66 maybe installed to sweep water which is on the left or right of the front wave deflector 58 laterally so that this water moves smoothly past the vertical divider wall 74 and main deck 18. Where the front wave deflector 58 is approximately as wide as the main deck 18, the three support braces 62 may each support the lower side of the front wave deflector 58 and a vertical closure panel may be attached to the left and right sides of the front wave deflector 58 to keep water from entering behind the front wave deflector 58.

Figure 8B:
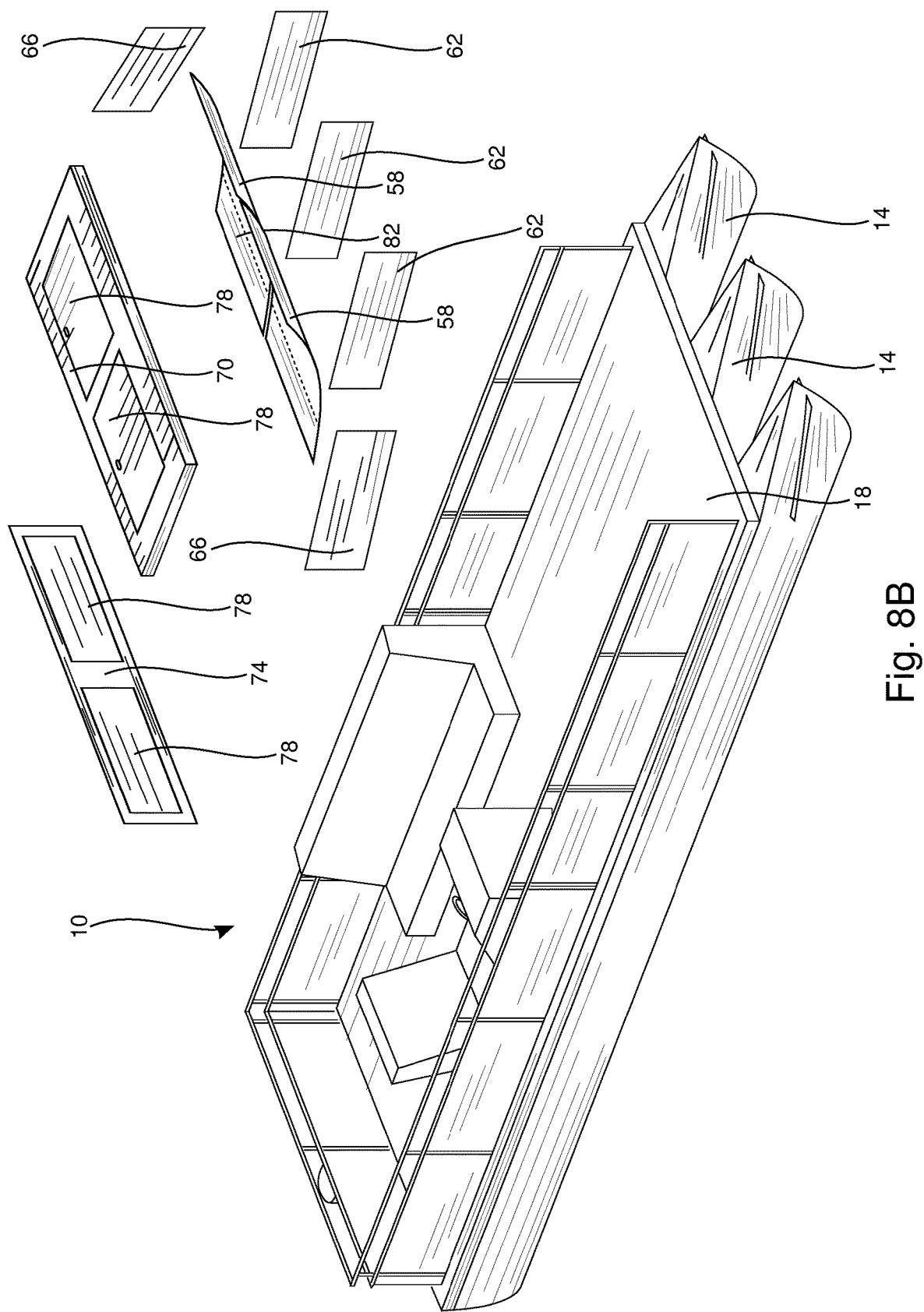
FIG. 8B shows an exploded view of the front of the pontoon boat.

FIG. 8B shows another example of the pontoon boat 10. As shown, the support braces 62 may be rectangular in shape and extend vertically above and below the front wave deflector 58 between the pontoon tubes 14 and the elevated fore deck 70. In this example, the front wave deflector 58 may be formed from a left (port) wave deflector section and a right (starboard) wave deflector section. The left front wave deflector section extends between the left support brace 62 and the middle support brace 62. The right front wave deflector section extends between the middle support brace 62 and the right support brace 62. In this manner, the left and right wave deflector sections create an overall front wave deflector 58 which is externally similar to the front wave deflector 58 which is shown in the other drawings and which functions in the same manner. The primary difference is the ease of fabrication and the internal hold volume created by the front wave deflector 58.

Additionally, the support braces 62 may be a combination of shaped external support braces 62 as shown in FIG. 8A and rectangular supports braces 62 as shown in FIG. 8B. For example, the port support brace 62 and the starboard support brace 62 may be rectangular support braces that extend vertically between the top of the pontoon tube 14 and the bottom of the elevated fore deck 70. The center support brace 62 may be a shaped support brace 62 that extends below the front wave deflector 58 and above the center pontoon tube 14, or alternatively between the elevated fore deck 70 and the top of the front wave deflector 58.

Figure 9:
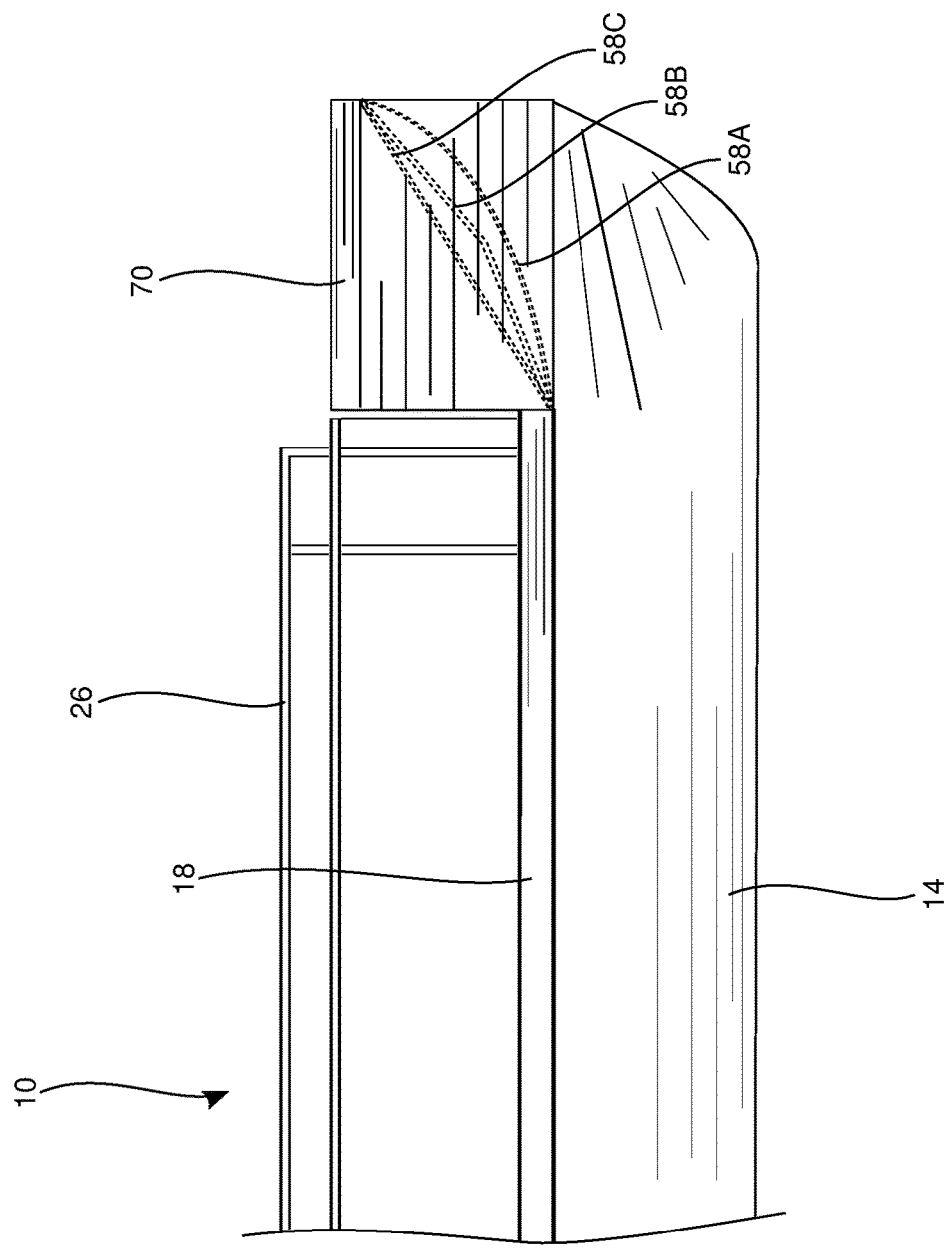
FIG. 9 shows a side view of the pontoon boat.

FIG. 9 shows a side view of the front of the pontoon boat 10 with different configurations of the front wave deflector 58. Multiple different shapes for the front wave deflector 58 are shown even though the pontoon boat 10 will typically be constructed with a single front wave deflector 58. For clarity, the support braces 62 and other structures have been omitted from the drawing. In one example, the front wave deflector 58 may have an upwardly curving shape as shown at 58A. The front wave deflector 58A may be formed from a curved panel or a combination of a curved panel and a straight panel to form the upwardly curving front wave deflector 58A. In another example, the front wave deflector 58 may be formed with two or more sections disposed at different angles as shown at 58B. The front wave deflector 58B may be formed from a single panel which is bent into two different planar sections or two planar panels which are attached together to form the bent front wave deflector 58B. In another example, the front wave deflector 58 may be formed as a single planar shape as shown at 58C. The front wave deflector 58C may be formed with a single panel or may be formed with two or more panels attached together in a planar configuration. The front wave deflector 58C is generally more easily formed than the front wave deflector 58A. Each of the front wave deflectors 58A, 58B, 58C would be used with the support braces 62 and other structures as shown above. The support braces 62 would be shaped to complement the shape of the front wave deflector 58.

Figure 10:
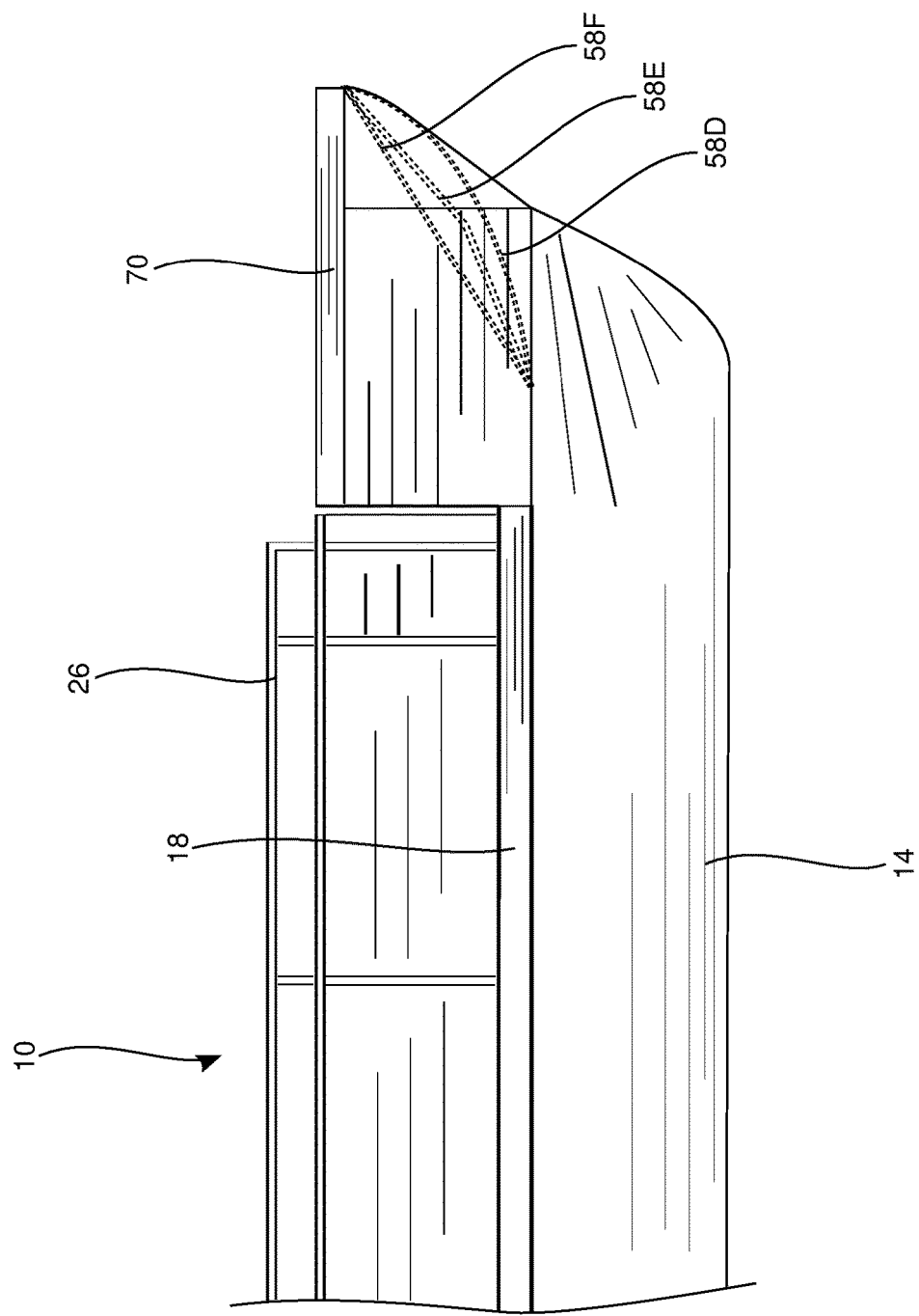
FIG. 10 shows another side view of the pontoon boat.

FIG. 10 shows another side view of the front of the pontoon boat 10 with additional configurations of the front wave deflector 58. Multiple different shapes for the front wave deflector 58 are shown even though the pontoon boat 10 will typically be constructed with a single front wave deflector 58. For clarity, some supporting structures have been omitted from the drawing although they would be used as shown above. The front wave deflector 58 has been moved forwards on the pontoons 14 as compared to that shown in FIG. 9. In one example, the front wave deflector 58 may have an upwardly curving shape as shown at 58D. The front wave deflector 58D may be formed from a curved panel or a combination of a curved panel and a straight panel to form the upwardly curving front wave deflector 58D. In another example, the front wave deflector 58 may be formed with two or more sections disposed at different angles as shown at 58E. The front wave deflector 58E may be formed from a single panel which is bent into two different planar sections or two planar panels which are attached together to form the bent front wave deflector 58E. In another example, the front wave deflector 58 may be formed as a single planar shape as shown at 58F. The front wave deflector 58F may be formed with a single panel or may be formed with two or more panels attached together in a planar configuration. The front wave deflector 58F is generally more easily formed than the front wave deflector 58D. Each of the front wave deflectors 58D, 58E, 58F would be used with the other structures as shown above. The support braces 62 would be shaped to complement the shape of the front wave deflector 58. As compared to the support brace 62 shown in the above figures, the support brace 62 may have a lower edge which angles forwards from the front of the pontoons 14 to the front edge of the front wave deflector. For safety, the support braces 62 shown in any of the figures may have an enlarged front edge such as a round tube or a flat strip attached to the front edge of the support brace. This may reduce the likelihood of injury should a person be in the area of these support braces 62.

Figure 11:
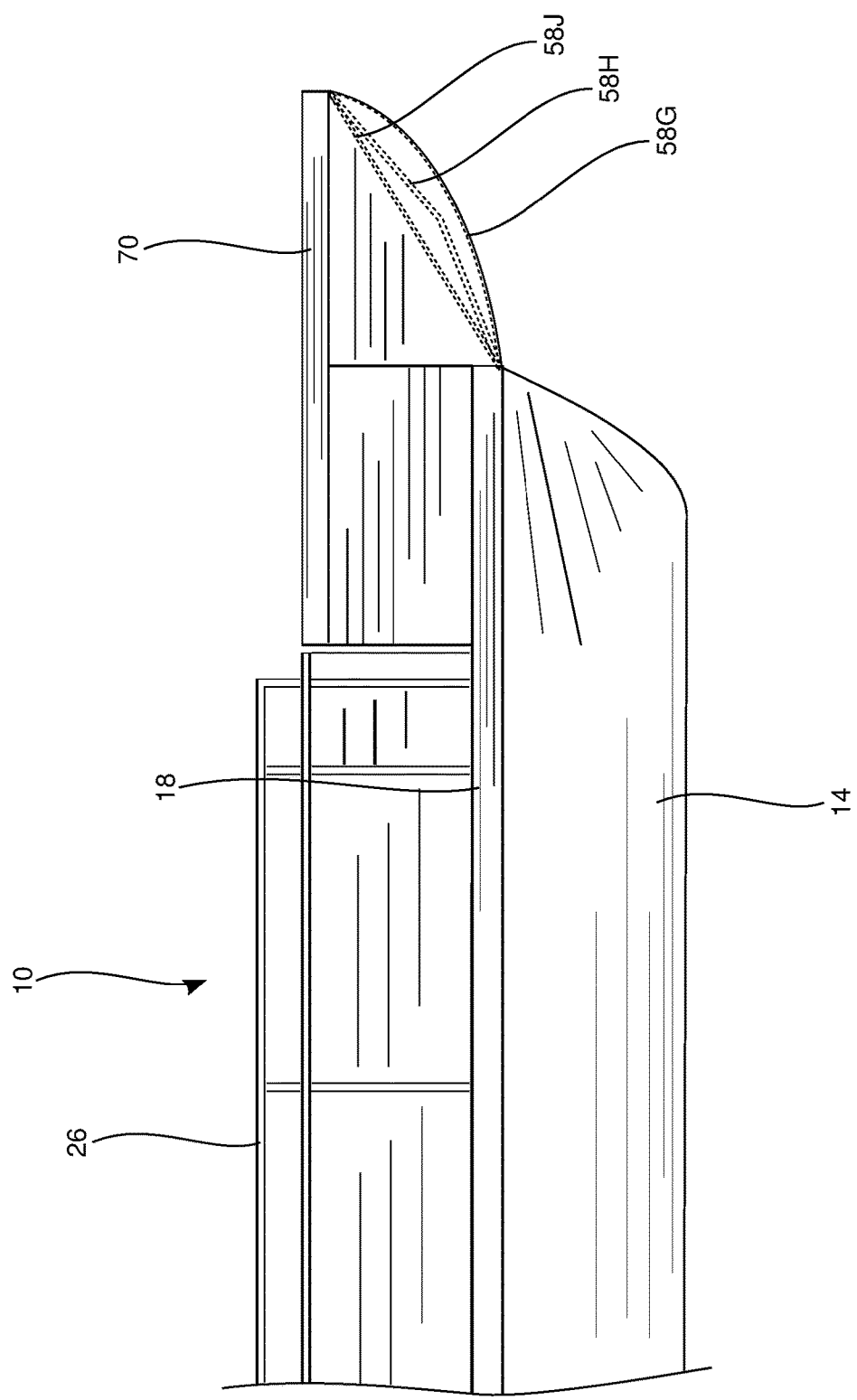
FIG. 11 shows another side view of the pontoon boat.

FIG. 11 shows another side view of the front of the pontoon boat 10 with additional configurations of the front wave deflector 58. Multiple different shapes for the front wave deflector 58 are shown even though the pontoon boat 10 will typically be constructed with a single front wave deflector 58. For clarity, some surrounding structures have been omitted from the drawing although they would be used as shown above. The front wave deflector 58 has been moved further forwards on the pontoons 14 as compared to that shown in FIGS. 9 and 10. In one example, the front wave deflector 58 may have an upwardly curving shape as shown at 58G. The front wave deflector 58G may be formed from a curved panel or a combination of a curved panel and a straight panel to form the upwardly curving front wave deflector 58G. In another example, the front wave deflector 58 may be formed with two or more sections disposed at different angles as shown at 58H. The front wave deflector 58H may be formed from a single panel which is bent into two different planar sections or two planar panels which are attached together to form the bent front wave deflector 58H. In another example, the front wave deflector 58 may be formed as a single planar shape as shown at 58J. The front wave deflector 58J may be formed with a single panel or may be formed with two or more panels attached together in a planar configuration. The front wave deflector 58J is generally more easily formed than the front wave deflector 58G. Each of the front wave deflectors 58G, 58H, 58J would be used with the other structures as shown above. The support braces 62 would be shaped to complement the shape of the front wave deflector 58. As compared to the support brace 62 shown in the above figures, the support brace 62 would typically be mounted to the top of the front wave deflector 58 when the front wave deflector 58 significantly overhangs the pontoons 14 since there remains little support underneath the front wave deflector 58. The support braces 62 would typically be a panel that extends between the top of the front wave deflector 58, the top of the pontoons 14, the bottom of the elevated fore deck 70, and the front of the vertical dividing wall 74. Additionally, the support brace 62 may be attached to the front of the main deck 18 depending on the design of the front wave deflector 58.

Figure 12:
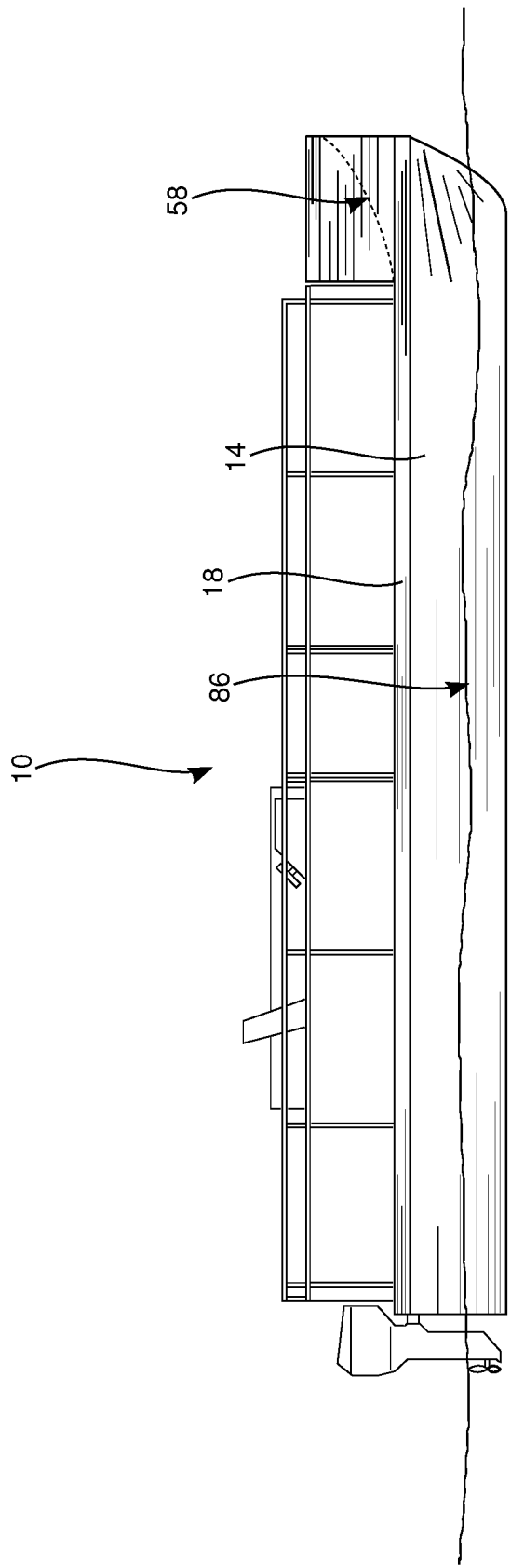
FIG. 12 shows a side view of the pontoon boat in water.

FIG. 12 shows a side view of the pontoon boat 10 in calm water 86. Pontoon boats 10 are typically designed so that the pontoon boat 10 floats with approximately ⅓ of the pontoon 14 submerged in the water 86. This leaves approximately ⅔ of the pontoon 14 out of the water. Since pontoons 14 are approximately 24 inches tall or taller, the top 16 inches or so of the pontoon 14 is out of the water 86. This places the main deck 18 approximately 16 inches above the surface of the water 86. When the pontoon boat 10 is moving through the water 86, the angled front bow of the pontoons 14 lifts somewhat; elevating the front of the pontoon boat 10 relative to the water 86. The main deck 18 of the pontoon boat 10 is thus well above the water 86 during normal operation of the boat 10. Accordingly, the front wave deflector 58 is also well above the water 86 during operation of the pontoon boat 10 in calm water. The wave deflector 58 is approximately 20 inches above the water 86 during operation of the pontoon boat 10 in calm water. Because of its position above the pontoons 14 and the deck 18, the front wave deflector 58 does not contact the water 86 during normal operation of the pontoon boat 10.

Figure 13:
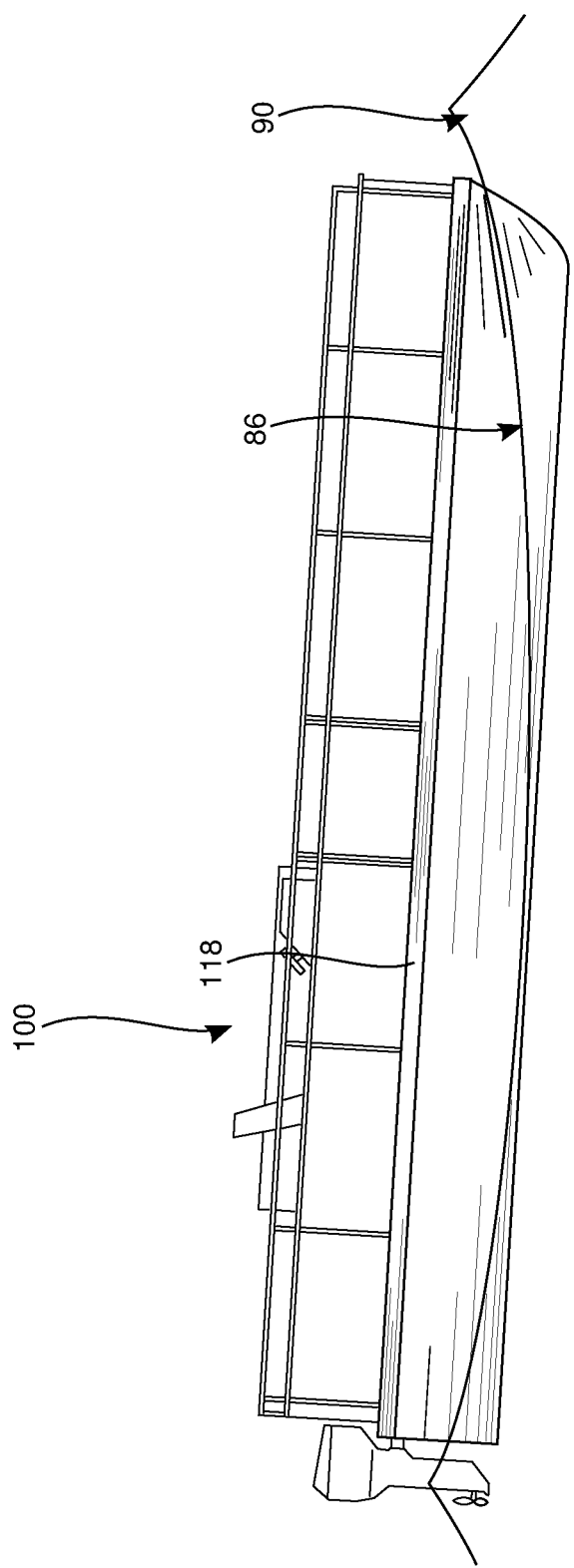
FIG. 13 shows a side view of a conventional pontoon boat in water.
Figure 14:
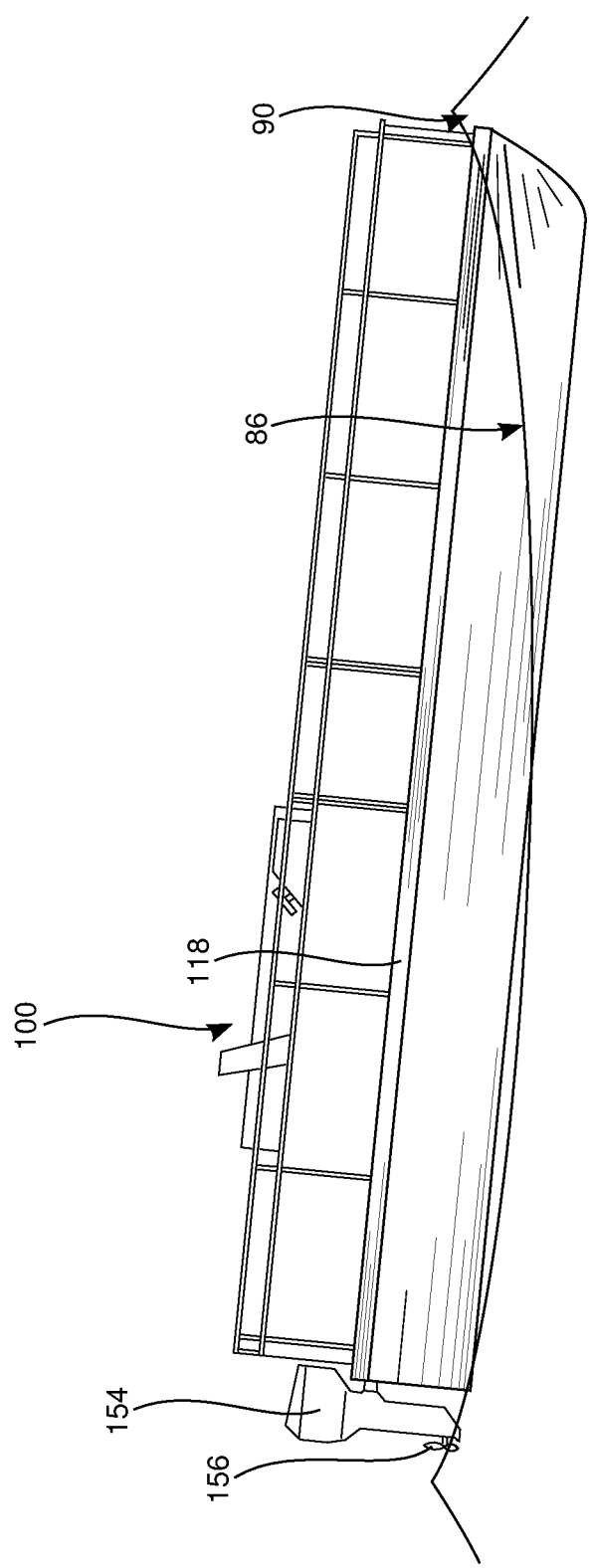
FIG. 14 shows a side view of a conventional pontoon boat in water.

FIGS. 13 and 14 show a side view of a conventional pontoon boat 100 in rough water. Conventional pontoon boats 10 are designed for operation in calm water and are used on inland lakes and some broad, calm rivers. Applicant has experience of being caught by surprise storms on Utah Lake, a relative small and shallow lake which is approximately 95,000 acres in area and about 14 feet deep. Moderate winds will cause relative small waves which are between about 8 and about 12 inches tall. When attempting to navigate the pontoon boat 100 across the waves, the boat 100 will pitch upward and rise while ascending a wave and then pitch downwardly and descend while moving down the back side of the wave as is shown in FIG. 13. The front of the conventional pontoon boat 100 is much deeper in the water 86; particularly with respect to the crest of the next wave 90. While crossing the waves, the crest of oncoming waves 90 is much higher relative to the deck 118 of the boat 100 than the absolute height of the wave 90 due to the downward motion and angle of the boat from crossing the previous wave. Applicant has discovered that even relatively small waves 90 will come over the front of the deck 118. As is illustrated in FIG. 14, relatively small waves will come over the front of the deck 118 and will push the front of the boat 100 further down into the water. Smaller waves 90 will often push the front of the boat 100 downwardly enough to lift the propeller 156 out of the water. This causes the motor 154 to over-rev and causes the boat 100 to lose speed. The conventional pontoon boat 10 is not particularly safe is rough waters and cannot easily navigate rough waters. Applicant has thus discovered that conventional pontoon boats 100 are not well suited for even moderately rough waters and it is easy to become stranded if a storm occurs.

Figure 15:
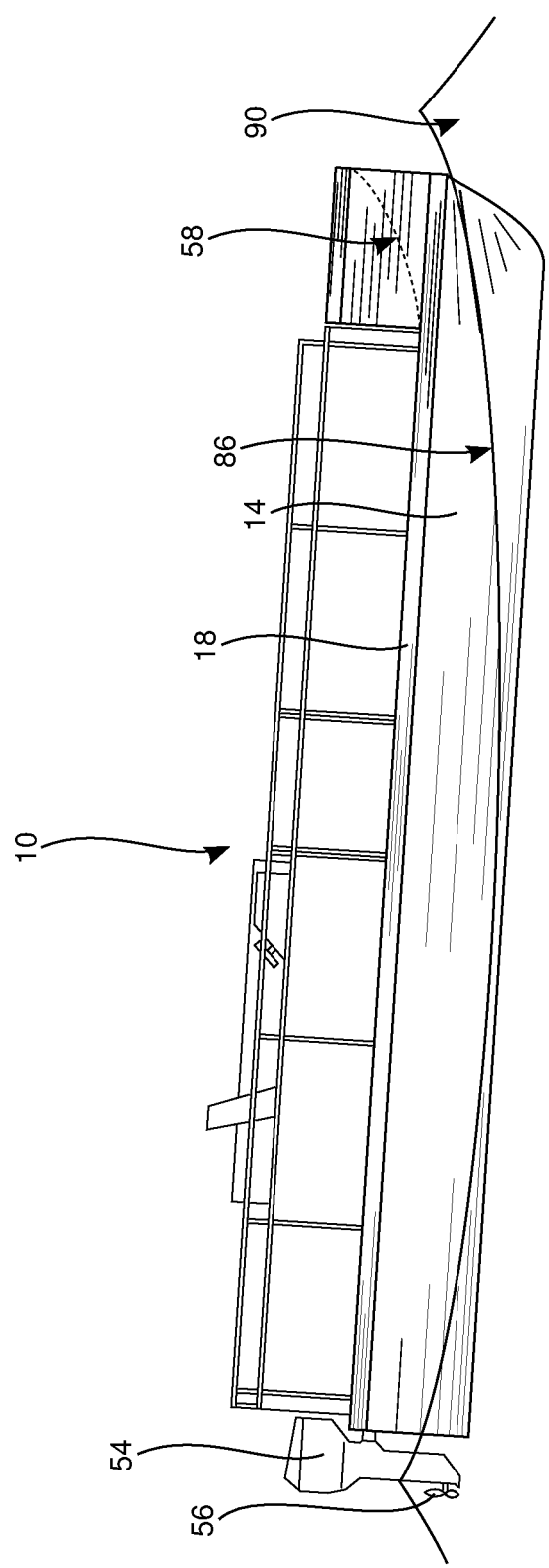
FIG. 15 shows a side view of the pontoon boat of FIGS. 1 through 12 in water.
Figure 16:
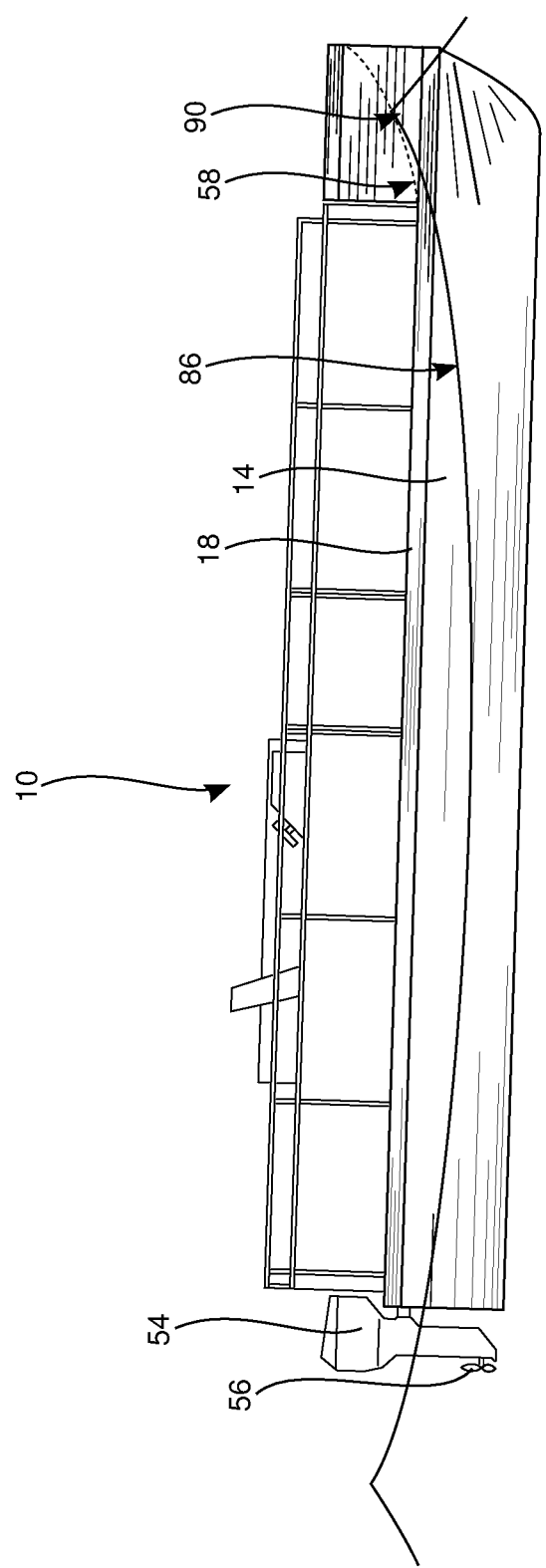
FIG. 16 shows a side view of the pontoon boat of FIGS. 1 through 12 in water.

FIG. 15 shows the pontoon boat 10 in rough waters. The pontoon boat 10 will tend to pitch up and down as it travels over a wave. The pontoon boat 10, however, keeps water from passing above the main deck 18 and is able to successfully navigate through rough waters. As the bow of the pontoon boat 10 approaches a wave 90, the crest of the wave 90 remains below the front wave deflector 58 even though the crest of the wave 90 is above the plane of the main deck 18. As the pontoon boat 10 continues towards the wave 90 as shown in FIG. 16, the wave 90 collides with the bottom of the front wave deflector 58 and is pushed downwardly beneath the main deck 18 and between the pontoon tubes 14. The force of pushing the wave 90 underneath the front wave deflector 58 also pushes up against the front wave deflector 58 and lifts the front of the pontoon boat 10. This levels the pontoon boat 10 and keeps the propeller 56 in the water 86; both preserving the motion of the pontoon boat 10 and allowing the motor 54 to continue propelling the pontoon boat 10 forwards. The front wave deflector 58 increases the stability of the pontoon boat 10 in rough water and reduces the pitch changes as the pontoon boat 10 passes over waves 90.

A conventional pontoon boat 10 is breached by smaller waves and the waves passing onto the pontoon boat deck 118 push the bow of the boat 100 down and stop its motion. Conventional pontoon boats lose stability and control over the pontoon boat in rough waters. They typically cannot navigate at speed and become significantly less safe due to pitching of the boat and the sudden loss of speed which occurs if a wave passes over the deck.

In contrast, the inventive pontoon boat 10 passes over larger waves and the bow of the boat 10 is lifted by the waves; leveling the boat 10 and allowing it to continue moving over the waves. The inventive pontoon boat 10 is stable when navigating over waves and maintains good control. The pontoon boat 10 can navigate at speed over waves and reduces changes in pitch and sudden changes in speed from the waves. The pontoon boat 10 provides a significant increase in safety and ability to navigate rough waters.

The inventive pontoon boat 10 was made by modifying a conventional pontoon boat 100 to remove a portion of the main deck 18 and to add the front wave deflector 58 support braces 62, elevated fore deck 70, and other associated structures. Applicant has tested the pontoon boat 10 out into the Gulf of Mexico during winds which produced waves more than 2 feet high. The pontoon boat 10 was able to maintain speeds between approximately 30 and 40 miles per hour through these waves. The pontoon boat 10 was also able to traverse the waves without experiencing significant pitching. While the pontoon boat 10 experienced some bouncing over the waves, it did not experience the significant fore and aft pitching that the conventional pontoon boat 100 experienced on much smaller waves. The pontoon boat 10 was able to sail over these waves and continue navigating through the rough waters while the conventional pontoon boat 100 was largely unable to navigate through much smaller waves of 1 foot or less. The pontoon boat 10 was also able to navigate through waves approximately 4 feet high in outer parts of the Gulf of Mexico. While the pontoon boat 10 experiences some bouncing over these waves, the water did not come over the front of the pontoon boat 10 and the pontoon boat was able to continue navigating. The pontoon boat 10 remained stable and controlled and was able to traverse the waves successfully. The inventive pontoon boat 10 traversed the rough waters in a manner similar to a larger "V" hull boat and did not experience the problems which conventional pontoon boats 100 experience in rough waters.

The pontoon boat 10 is advantageous as it combines the native buoyancy of pontoon tubes 14 and the recreational utility of a flat pontoon boat deck with the ability to navigate rough waters in a manner similar to a "V" hull boat. The pontoon boat 10 increases the safety in using a pontoon boat as it is able to continue navigating through rough waters where a conventional pontoon boat was largely stopped by the waves.

Another advantage of the pontoon boat 10 is the ability to anchor the pontoon boat 10 in rough waters and wind without taking water over the deck of the boat. An anchor rope and anchor may be attached to the center front area of the front wave deflector 58 or the elevated fore deck 70. When the pontoon boat 10 is anchored, wind will push the pontoon boat away from the anchor and will weather-vane the pontoon boat 10 into the wind. Since the waves 90 are generally aligned with the prevailing wind, the waves 90 will strike the front of the pontoon boat 10. Any waves which may normally pass over the deck 18 will instead collide with the front wave deflector 58. The waves will push against the front wave deflector 58 and will lift the front of the pontoon boat 10 over the wave 90; keeping the waves off of the pontoon boat deck 18.

In contrast, conventional pontoon boats are often susceptible to having water come over the deck if anchored in rough water.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims.

What is claimed is:

1. A pontoon boat comprising:
   a first pontoon, the first pontoon comprising a sealed and hollow tube having a length which is at least five times a diameter of the pontoon tube, wherein the pontoon tube is positioned along a length of a pontoon boat;
   a second pontoon, the second pontoon comprising a sealed and hollow tube having a length which is at least five times a diameter of the pontoon tube, wherein the pontoon tube is positioned along a length of the pontoon boat;
   wherein the first pontoon and the second pontoon are positioned parallel to each other along left and right sides of the pontoon boat;
   a generally planar main deck comprising a front and a rear, wherein the rear of the main deck is positioned near a rear end of the first pontoon and a rear end of the second pontoon;
   wherein the main deck is positioned adjacent a top of the first pontoon and adjacent a top of the second pontoon and wherein the main deck is attached to the top of the first pontoon and the top of the second pontoon;
   a front wave deflector which is attached adjacent to the front edge of the main deck and which extends forwards and upwards from the front edge of the main deck;
   wherein the front of the main deck is positioned behind a front end of the first pontoon and a front end of the second pontoon;
   wherein a front edge of the front wave deflector is aligned with the front end of the first pontoon and the front end of the second pontoon relative to a fore and aft dimension of the pontoon boat;
   wherein the front wave deflector extends laterally and is positioned between the first pontoon and the second pontoon with respect to a horizontal direction; and
   wherein the front wave deflector has a vertical height above the first pontoon which is approximately equal to or greater than one third of a vertical height of the first pontoon.

2. The pontoon boat of claim 1, wherein the front wave deflector extends upwardly and forwardly from the front of the main deck at an angle which is between approximately 30 degrees and approximately 45 degrees.

3. The pontoon boat of claim 1, wherein the front wave deflector is positioned such that it is above a surface of calm water while the boat is floating in or moving through the calm water.

4. The pontoon boat of claim 1, wherein the front wave deflector has a front to back length which is about one seventh of the length of the pontoon boat.

5. The pontoon boat of claim 1, further comprising a first support brace attached to the front wave deflector and attached to the first pontoon and a second support brace attached to the front wave deflector and attached to the second pontoon to hold the front wave deflector above the first pontoon and the second pontoon.

6. The pontoon boat of claim 1, further comprising a planar elevated fore deck located above the front wave deflector.

7. The pontoon boat of claim 1, further comprising a vertical dividing wall located behind the front wave deflector and adjacent the front of the main deck, and wherein the vertical dividing wall extends vertically above the main deck.

8. A pontoon boat comprising:
   a first pontoon comprising a sealed and hollow tube which is positioned lengthwise along a port side of a pontoon boat;
   a second pontoon comprising a sealed and hollow tube which is positioned lengthwise along a starboard side of the pontoon boat parallel to the first pontoon;
   a generally planar main deck which is positioned above the first pontoon and the second pontoon and which is attached to a top of the first pontoon and a top of the second pontoon, the main deck comprising a rear edge which is positioned towards a rear of the pontoon boat and comprising a front edge which is positioned adjacent a front end of the first pontoon and a front end of the second pontoon;
   a front wave deflector which is attached to the front edge of the main deck and which extends forwards and upwards from the front edge of the main deck to a position above the main deck;

wherein the front wave deflector extends laterally and is positioned between the first pontoon and the second pontoon with respect to a horizontal direction; and wherein the front wave deflector has a vertical height above the top of the first pontoon which is equal to or greater than one third of a vertical height of the first pontoon; and wherein the front wave deflector is attached adjacent a front of the first pontoon and a front of the second pontoon such that substantially all of the front wave deflector which extends forwards and upwards from the main deck and is disposed in front of the front of the first pontoon and in front of the front of the second pontoon.

9. The pontoon boat of claim 8, wherein the front wave deflector extends upwardly and forwardly from the front edge of the main deck at an angle which is between approximately 30 degrees and approximately 45 degrees.

10. The pontoon boat of claim 8, wherein the front wave deflector is positioned such that it is above a surface of calm water while the boat is floating in or moving through the calm water.

11. The pontoon boat of claim 8, further comprising a first support brace attached to the front wave deflector and attached to the first pontoon and a second support brace attached to the front wave deflector and attached to the second pontoon to hold the front wave deflector above the first pontoon and the second pontoon.

12. The pontoon boat of claim 8, further comprising a planar elevated fore deck attached to a top of the front wave deflector.

13. A pontoon boat comprising:
a first pontoon which is positioned lengthwise along a pontoon boat;
a second pontoon which is positioned lengthwise along the pontoon boat parallel to the first pontoon;
a generally planar main deck positioned above the first pontoon and the second pontoon and attached to the first pontoon and the second pontoon, the main deck comprising a front and a rear and being positioned lengthwise along the pontoon boat;
a front wave deflector which is attached adjacent to the front edge of the main deck and which extends forwards and upwards from the front edge of the main deck to a position above the main deck;
wherein the front wave deflector extends laterally and is positioned between the first pontoon and the second pontoon with respect to a horizontal direction; and wherein the front wave deflector has a vertical height above the top of the first pontoon which is equal to or greater than one third of a vertical height of the first pontoon; and wherein the front wave deflector extends forwards and upwards such that the front wave deflector is positioned above a front of the first pontoon and above a front of the second pontoon with a distance separating a bottom surface of the front wave deflector and a top of the first pontoon and a top of the second pontoon.

14. The pontoon boat of claim 13, further comprising a first support brace attached to the front wave deflector and attached to the first pontoon and a second support brace attached to the front wave deflector and attached to the second pontoon to hold the bottom surface of the front wave deflector above the front of the first pontoon and the front of the second pontoon.

15. The pontoon boat of claim 14, wherein a front edge of the of the front wave deflector is positioned in front of the front of the first pontoon and the front of the second pontoon, wherein a front edge of the first support brace extends upwardly and forwardly from the front of the first pontoon towards a front of the first support brace, and wherein a front edge of the second support brace extends upwardly and forwardly from the front of the second pontoon towards a front of the second support brace.

16. The pontoon boat of claim 13, wherein a front edge of the main deck is positioned behind the front of the first pontoon and the front of the second pontoon.

17. The pontoon boat of claim 16, wherein a front edge of the front wave deflector is positioned adjacent to the front of the first pontoon and the front of the second pontoon relative to a fore and aft dimension of the pontoon boat.

18. The pontoon boat of claim 13, wherein the front wave deflector extends upwardly and forwardly from the front edge of the main deck at an angle which is between approximately 30 degrees and approximately 45 degrees.

19. The pontoon boat of claim 13, wherein the front wave deflector is positioned such that it is above a surface of calm water while the boat is floating in or moving through the calm water.

20. The pontoon boat of claim 13, further comprising a planar elevated fore deck attached to a top of the front wave deflector.

* * * * *